United States Patent

[11] 3,573,871

[72] Inventor John A. Warner
 Tyler, Tex.
[21] Appl. No. 774,782
[22] Filed Nov. 12, 1968
[45] Patented Apr. 6, 1971
[73] Assignee Tyler Pipe Industries, Inc.
 Tyler, Tex.

[54] GASKET FOR BELL-TYPE PIPE JOINT
 5 Claims, 5 Drawing Figs.
[52] U.S. Cl. .................................................... 277/168,
 277/207, 277/208, 285/110
[51] Int. Cl. .................................................... F16j 9/00,
 F16l 19/00
[50] Field of Search .......................................... 277/168,
 178, 207 (A), 169, 209, 208

[56] References Cited
 UNITED STATES PATENTS

| | | | |
|---|---|---|---|
| 3,081,102 | 3/1963 | Murray et al. | 277/168 |
| 3,325,174 | 6/1967 | Weaver | 277/168 |
| 3,386,745 | 6/1968 | Hein | 277/207 |
| 3,390,890 | 7/1968 | Kurtz | 277/207 |
| 3,414,273 | 12/1968 | Sumner | 277/207 |

*Primary Examiner*—Samuel B. Rothberg
*Attorney*—Ralph R. Browning

ABSTRACT: A gasket preferably of rubber or other suitable elastomer for providing a seal and mechanical joint between the components of a telescoping-type joint such as customarily referred to as a bell-and-spigot-type joint or as a bell-type pipe joint. It is similar in some respects and in purpose to the gasket disclosed in U.S. Pat. No. 3,081,102, issued Mar. 12, 1963, for Gasket for Telescoping Joint, but has its exterior surface divided into two axially spaced sealing surfaces adapted to engage the interior of the bell, with a surface of slightly lesser diameter between them to partly relieve the friction between the gasket and the bell and make the gasket easier to insert into the bell. It also includes a sealing bead on the exterior sealing surface which is adapted to extend fartherest into the bell in use and so positioned that when being pushed into the bell it will tend to rotate such sealing surface in a direction to partly relieve the pressure thereof against the interior of the bell and thus facilitate the insertion of the gasket into the bell, but will inhibit rotation in the opposite direction to the original position and thereby strengthen certain of the seals. The reduction of the outer diameter of a part of the outer surface of the gasket facilitates such rotation of the sealing surface and relief of its pressure during insertion. The gasket also has a locking bead on the exterior sealing surface closest to the open end of the bell in use and this bead is joined to the portion of smaller exterior diameter by a tapered substantially conical portion which both makes it easier to start into the mouth of the bell during insertion and also makes it possible for this bead to lock into the locking grooves of various different shapes made by different pipe manufacturers without appreciable distortion.

PATENTED APR 6 1971 3,573,871

John A. Warner
INVENTOR

BY Browning, Hyer,
Eickenroht + Thompson
ATTORNEYS

GASKET FOR BELL-TYPE PIPE JOINT

BACKGROUND OF THE INVENTION

This invention relates in general to a sleevelike gasket intended to provide a seal as well as a tight mechanical joint between two pieces of pipe in a joint of the type customarily referred to as a bell-and-spigot joint or as a bell-type pipe joint. Its purpose and use are similar to the gasket shown in U.S. Pat. No. 3,081,102, issued Mar. 12, 1963, for Gasket for Telescoping Joint, of which applicant's assignee is part owner.

The gasket of said patent has been extensively used with a high degree of success. However, it has been quite difficult to insert into the bell end of a pipe during the formation of a joint, particularly in the smaller sizes, it being necessary for the purposes of such insertion to press the sleeve radially inwardly at one point until the loop so moved inwardly is moved substantially past the center of the gasket and substantially into contact with the opposite side and so held while being inserted into the bell, thereafter being allowed to expand into the interior of the bell. It has been quite desirable that a gasket be provided, for use particularly in smaller sizes, which would not have such great friction between it and the bell during insertion as to require the method just described. Obviously the smaller the size, the greater need for so folding a gasket during insertion, and the more difficult the folding operation.

Hence it is one of the objects of this invention to provide a gasket of the character under discussion which will have less frictional resistance to being inserted into a bell.

Furthermore, the shape of the locking bead which in the type of gasket under discussion extends outwardly into a groove in the interior of the bell in use so as to lock the gasket within the bell, has not been applicable to all designs of pipe, because of the fact that different manufacturers make such a groove in their bell end which is of different cross-sectional shape from the circular shape of locking bead shown in the above-mentioned prior patent.

Hence it is a further object of this invention to provide a gasket of the character under discussion with a locking bead which may be employed without appreciable distortion, with pipes whose bells have different cross-sectional shape of grooves for receiving such bead, and particularly with pipes having substantially V-shaped grooves as well as grooves of partially circular cross section.

Other objects and advantages of this invention will become apparent from the following description taken in connection with the accompanying drawings wherein is set forth by way of illustration and example and not by way of limitation one embodiment of the invention.

Figure 1:
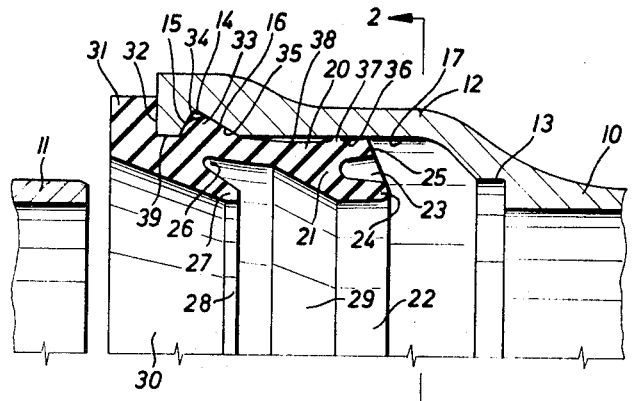
FIG. 1 is a partial sectional view taken along the longitudinal axis of the ends of two pieces of pipe adapted to form a joint of the bell type, with a gasket embodying this invention shown in place in the bell end and the parts illustrated prior to the insertion of the spigot or plain pipe end.
Figure 2:
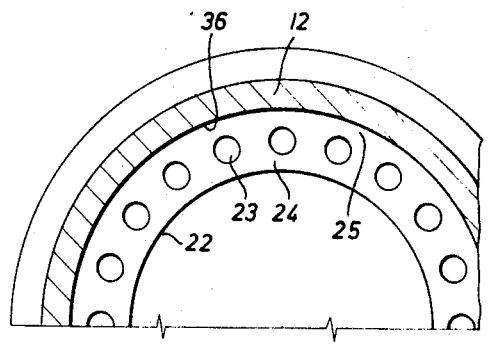
FIG. 2 is a transverse cross section through the bell end of FIG. 1 taken along the line 2—2 of FIG. 1.
Figure 4:
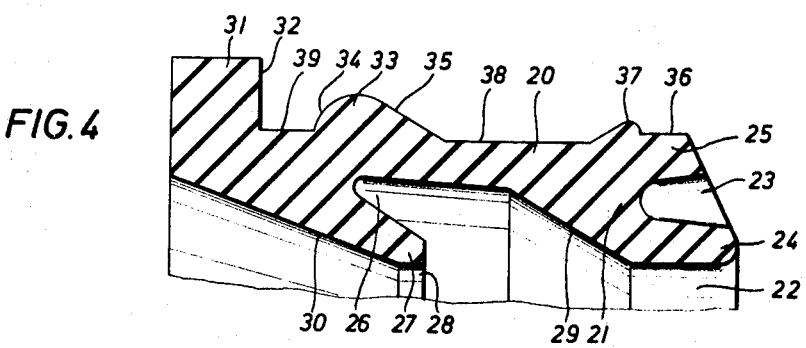
FIG. 4 is a view similar to FIG. 1 but taken through the gasket alone prior to its insertion into a bell end as shown in FIG. 1.
Figure 5:
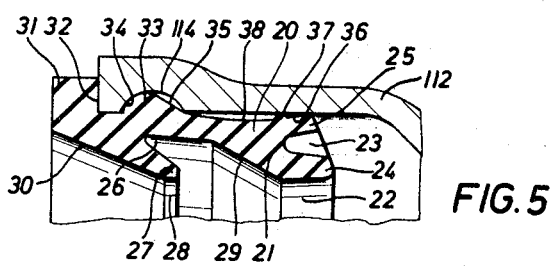
FIG. 5 is a view similar to FIG. 1 but showing a bell end of different design of groove for receiving the locking bead.

In the example shown in the drawing and described in the following specification the objects of this invention are achieved by a few changes in the exterior contour of the gasket which changes, as compared with the aforesaid prior patent appear to be quite small, but which have proven in practice to be quite effective. The portion of the gasket between the two exterior sealing surfaces has first been made of a diameter slightly reduced as compared with that of the exterior sealing surfaces. This alone effects a substantial reduction in the frictional engagement between the exterior of the gasket and the interior of the bell during insertion of the gasket and much facilitates such insertion. At the same time it makes the midportion of the length of the gasket have a thinner wall and hence be more flexible, which, during the insertion of the gasket, tends to permit the sealing surface which moves furtherest into the gasket to rotate about an axis located within its cross section and thereby relieve some of the pressure of this sealing surface against the bell during such insertion. This rotation is evidenced by the bowing of surface 38 in FIG. 1 and FIG. 5 as compared with its normally straight configuration as shown in FIG. 4. FIGS. 1 and 5 also show how the sealing bead holds the innermost sealing portion in its rotated position.

To promote such a tendency toward rotation of the sealing surface and thus decrease its pressure against the bell, there is provided a sealing bead which is small in cross section but projects outwardly beyond the exterior sealing surface on the gasket and is between that surface which extends furtherest into the bell and that surface which is of reduced diameter. Furthermore, the sealing bead is of such a configuration that it holds the rotated portion in a rotated position, i.e. it inhibits rotation in the opposite direction. This strengthens the sealing effect of the gasket.

Figure 3:
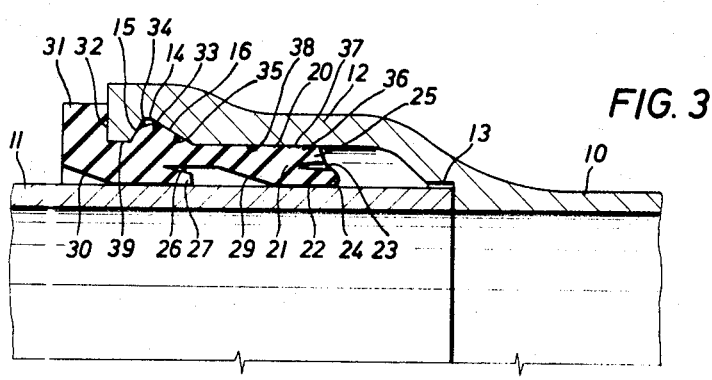
FIG. 3 is a view similar to FIG. 1 but showing the joint after the same has been assembled.

Another modification lies in the shape of the locking bead which, instead of being made of a partial circular cross section as in the above-mentioned prior patent, which would only fit into a bell with a correspondingly shaped locking groove, this locking bead is made to some degree in a circular cross section but its outer crest is joined by means of a tapered surface to the portion of reduced outer diameter of the gasket. This serves the double purpose of making this locking bead capable of fitting in a groove of different cross section as shown in FIG. 1 and FIG. 3, as well as in a groove of circular cross section as shown in FIG. 5. It will be noted that the bead is not appreciably distorted by insertion into either type of groove, i.e. its shape in FIGS. 1, 3 and 5 is essentially the same as that in FIG. 4. The shape of the locking bead also makes the gasket easier to insert by providing a tapered surface leading up to the crest of the locking bead.

Referring more in detail to the drawing, the pipe ends to be joined consist of the customary bell end 10 and pipe end 11 which is of a size to fit within the bell end. On the bell end is formed the customary bell 12, and at the point where this bell joins onto the pipe there is preferably a small counterbore 13 for receiving the end of the pipe 11 when it is placed within the bell 12 to complete the joint.

In the joint shown in FIG. 1 and FIG. 3, the bell 12 has a locking groove 14 whose flanks are formed by a pair of substantially conical walls 15 and 16. The wall 15 is steeper than the wall 16 so as to provide a sharpe barrier against movement of the gasket out of the groove and out of the bell. The inner surface 17 of the bell is the sealing surface thereof.

With reference to the gasket itself, it is indicated in general by the numeral 20 and has one rather massive portion of a thickness to fit tightly between the bell and the pipe end and be so distorted by being between such elements as to form a seal against both, as shown by the numeral 21. This portion 21 forms a seal on the interior sealing surface 22 against the exterior of the pipe end 11, being increased in interior diameter sufficiently by the insertion of such pipe end so that by virtue of its resiliency it will maintain a pressure-type seal thereagainst. Such seal is enhanced by virtue of the openings 23 extending into the body 21 from that end which is exposed to pressure within the pipe. This pressure within the openings 23 will tend to push the lip-type part 24 bearing the interior sealing surface 22 closer against the pipe. At the same time, the presence of the openings 23 will make portion 24 more flexible and allow freer insertion of the pipe 11, thereby facilitating the assembly of the joint.

Radially outwardly of the openings 23 is another lip-type part 25 and these two lip-type parts tend to be spread apart by pressure within the openings 23 but inherently will have sufficient resilience to provide initial sealing against both the pipe end 11 and the bell 12.

Adjacent the opposite end of the gasket it is undercut to provide the thin walls of the midportion above mentioned which makes for greater flexibility of the midportion of the gasket, and the undercutting is extended at 26 in such fashion as to provide a lip-type portion 27 having a second internal sealing surface 28 about its inner periphery. The sealing surface likewise is on a flexible portion 27 so that this will facilitate the insertion of the pipe end.

Further facilitating the insertion of the pipe end into this gasket is the fact that the surfaces 29 and 30 leading to these interior sealing surfaces 22 and 28, respectively, are formed on substantially conical tapers from a larger cross section to a smaller cross section at the sealing surfaces.

The shank or outer end of the gasket is formed with a flange 31 having a forward shoulder 32 adapted to shoulder against the end of the bell 12 and thus limit the extent to which the gasket may be inserted in a bell.

The locking bead 33 has an arcuate portion disposed toward the outer end of the bell as shown at 34 and will readily fit a bell such as 112 shown in FIG. 5 having a locking groove 114 with a circular cross section. However, by virtue of the tapered surface 35 it will likewise readily fit a locking groove such as 14 having tapered surfaces 15 and 16 as shown in FIGS. 1 and 3. FIGS. 1, 3 and 5 likewise show that the shape of the locking bead after insertion into either a circular or a V-shaped groove is essentially the same as its normal shape, which is shown in FIG. 4. The tapered surface 35 furthermore makes the gasket of this invention easier to insert into a bell than those previously employed.

The outer surface of the lip-type portion 25 is provided with an outer sealing surface 36 adapted to seal against the interior of the bell at the position most remote from the entrance to the bell. A sealing bead 37 is interposed between this sealing surface 36 and the portion 38 on the exterior of the gasket, this portion 38 being the one previously mentioned as having been made of smaller external diameter than the sealing surface 36 for the purpose of facilitating movement of the gasket into the bell, both because of being of a smaller diameter, and because of making the midportion of the gasket more flexible. This sealing bead 37 furthermore is so positioned that when a force is exerted toward moving this gasket into a bell, the bell will engage the bead 37 and force it toward the flanged edge 31 of the gasket and also radially inwardly, tending to rotate the entire body portion 21 of the gasket counterclockwise as seen in the various figures of the drawing and thereby to relieve a portion of the friction against the sealing surface 36 during insertion of the gasket. After insertion of the gasket, the bead 37 serves to hold portion 21 in its rotated position as shown in FIGS. 1 and 5 and thereby strengthen the seals between surfaces 22 and 36 and their respective sealing surfaces on the pipe and in the bell.

As above indicated, the tapered substantially conical surface 35 joins the reduced outer diameter portion 38 of the gasket with the crest of the locking bead 33, and the locking bead 33 is interposed between the surface 38 and a second exterior sealing surface 39 on the gasket.

From the foregoing it will be seen that a means has been provided whereby the objects and advantages sought by this invention will be fully attained and it will readily be understood by those skilled in the art that variations in sizes and inclinations of surfaces may be made while still achieving such results, the foregoing description and the accompanying drawings being for the purpose of disclosing a preferred example of this invention and the manner in which it may be used, as well as teaching its essentials and making clear to those skilled in the art the manner in which its benefits are secured, but without disclosing specifically all its forms and variations.

I claim:

1. An annular resilient gasket for flexibly joining and sealing and mutually centering the interfitting components of a bell type pipe joint; comprising, an elastomer sleeve having a plurality of axially spaced exterior sealing surfaces each adapted to sealingly engage the interior of the bell component of such a joint when forced into same, and a plurality of axially spaced interior surfaces adapted to sealingly engage the exterior of the pipe and component of such joint when such component is forced into the sleeve, said interior surfaces being on outwardly deflectable annular liplike portions and said exterior surfaces being on relatively more rigid portions of the sleeve and said sleeve being continuous between said exterior sealing surfaces, the improvement which comprises, a portion of said sleeve between said exterior sealing surfaces being of smaller outer diameter than said external sealing surfaces but approximately as large as said external sealing surfaces when the latter are compressed inwardly sufficiently to form a seal within a bell component of a joint, whereby the friction of introduction of said sleeve into a bell is greatly reduced and the introduction facilitated and in which the improvement also includes a sealing bead between the exterior sealing surface adapted to be furtherest into the bell component in use and the portion of smaller diameter between said exterior sealing surfaces and projecting outwardly beyond said exterior sealing surfaces, whereby during introduction into a bell said bead tends to rotate the exterior surface to which it is adjacent in a direction to partly relieve its pressure against the bell.

2. An annular gasket as in claim 1 in which the improvement includes a locking bead adjacent and projecting outwardly beyond the exterior sealing surface adapted to be closer to the open end of the bell component in use.

3. An annular gasket as in claim 2 in which the improvement includes said locking bead being adjacent said surface of smaller outer diameter and the outermost portion of said bead being joined to said surface of smaller diameter by a substantially conical tapered surface.

4. An annular gasket as in claim 2 in which the improvement includes the sealing bead projecting outwardly beyond said exterior sealing surfaces less than said locking bead.

5. An annular resilient gasket for flexibly joining and sealing and mutually centering the interfitting components of a bell type pipe joint; comprising, an elastomer sleeve having a plurality of axially spaced exterior sealing surfaces each adapted to sealingly engage the interior of the bell component of such a joint when forced into the same, and a plurality of axially spaced interior surfaces adapted to sealingly engage the exterior of the pipe end component of such joint when such component is forced into the sleeve, said interior surfaces being on outwardly deflectable annular liplike portions and said exterior surfaces being on relatively more rigid portions of the sleeve and said sleeve being continuous between said exterior sealing surfaces, the improvement which comprises, a portion of said sleeve between said exterior sealing surfaces being of smaller outer diameter than said external sealing surfaces but approximately as large as said external sealing surfaces when the latter are compressed inwardly sufficiently to form a seal within a bell component of a joint, whereby the friction of introduction of said sleeve into a bell is greatly reduced and the introduction facilitated, the improvement which also comprises a locking bead adjacent and projecting outwardly beyond the exterior sealing surface adapted to be closer to the open end of the bell component in use, said locking bead being adjacent said surface of smaller outer diameter and the outermost portion of said bead being substantially circular in cross section and and being joined to said surface of smaller diameter by a substantially conical tapered surface.